United States Patent
Campbell

[11] Patent Number: 6,112,619
[45] Date of Patent: Sep. 5, 2000

[54] HAND WHEEL COVER WITH INDICATOR

[76] Inventor: Terry A. Campbell, 1695 Pearson Avenue, Prince George, BC, Canada, V2L 4K7

[21] Appl. No.: 09/139,596

[22] Filed: Aug. 25, 1998

[51] Int. Cl.[7] .................................................. F16K 37/00
[52] U.S. Cl. ............................ 74/553; 116/277; 74/558
[58] Field of Search ..................... 74/553, 558.5, 74/558; 150/155, 156; 116/277, 247, DIG. 21

[56] References Cited

U.S. PATENT DOCUMENTS

| Re. 26,838 | 3/1970 | Pecis | 116/277 X |
|---|---|---|---|
| 3,910,308 | 10/1975 | Mack | 116/277 X |
| 4,165,659 | 8/1979 | Fawley | 74/558 |
| 4,665,386 | 5/1987 | Haws | 116/277 X |
| 4,999,875 | 3/1991 | Rybak | 74/553 X |
| 5,303,612 | 4/1994 | Odom et al. | 74/553 |

*Primary Examiner*—Mary Ann Battista
*Attorney, Agent, or Firm*—Kolisch Hartwell Dickinson McCormack & Heuser

[57] ABSTRACT

A hand wheel cover for a valve on a gas bottle or cylinder provides a better grip for the hand wheel and also has a larger area for indicating opening and closing rotational directions. In another embodiment an indicator hand wheel cover has an indicator that shows whether a hand wheel is open or closed and has a positive lock when the cover is in the open position with a release to fill a top portion of the cover and return it to provide an indication that the valve is closed. The indicator hand wheel cover has a bottom portion with a recess underneath to fit over and engage a hand wheel, a top portion retained to the bottom portion and rotatable from a first position to a second position, the top portion having visual openings that view a first location on the bottom portion in the first position and a second location on the bottom portion in the second position, the second location being visually distinctive from the first location, a locking mechanism to lock the top portion to the bottom portion when the top portion is rotated from the first position to the second position, and a release for the locking mechanism to release the top portion from the bottom portion in the second position, to permit the top portion to be rotated from the second position to the first position.

14 Claims, 6 Drawing Sheets

HAND WHEEL COVER WITH INDICATOR

FIELD OF THE INVENTION

The present invention relates to a hand wheel cover for a valve, and more specifically, to a hand wheel cover for a valve on a gas bottle or gas line.

DESCRIPTION OF RELATED ART

Hand wheels on gas valves used for propane tanks, acetylene cylinders and other types of gas cylinders are generally rather small, difficult to grip, and in some cases, it is difficult to read and see which direction one must rotate the hand wheel to open or close the valve. The problem with direction arises because propane tanks used on barbecues and the like have left-handed connection threads, thus there is some confusion as to whether opening a valve requires the normal anticlockwise rotation or clockwise rotation.

Furthermore, there is a need for a hand wheel cover that has an indicator to indicate whether the valve is open or closed. This is particularly useful for propane tanks on barbecues, also for acetylene cylinders and oxygen cylinders, so that a person can see from a distance whether the valve has been turned off or not, rather than having to rotate the hand wheel.

Indicators that show whether a valve has been closed or not are available, however, these indicators generally do not have a positive position, which means that the moment one commences to turn the valve off, the indicator shows that it is closed. What it does not show is if the valve is completely closed, and in some cases, this may be a disadvantage. There is also the risk that the indicator is knocked or bumped and accidentally shows the closed position.

SUMMARY OF THE INVENTION

The present invention provides first of all a molded hand wheel cover that is larger than a normal hand wheel and thus provides a better grip than a normal hand wheel. Also, the cover has ribbed external edges for improved gripping. The cover has a recess underneath the molded cover to fit over a hand wheel, and in other embodiments, has a recess that is designed to fit over more than one type of hand wheel. Many types of hand wheels are used on gas cylinders and gas tanks. By providing a hand wheel cover that is adaptable to different sizes of hand wheels and different shapes of hand wheels, one is able to provide a cover suitable for most gas valves. Furthermore, locking tabs are provided on the hand wheel cover so that the hand wheel cover is retained on the hand wheel and can only be removed by unlocking the locking tabs. Because the cover is larger than existing hand wheels, rotational arrows indicating open and closed directions are clearly visible for the user.

In another embodiment, the hand wheel cover has an indicator cap which has open and closed positions. The indicator cap is formed of two portions, a top portion and a bottom portion. To open the valve, the top portion is rotated on the bottom portion from a first position to a second position, and windows for visual openings are provided in the top portion. When the top portion is rotated from the first position to the second position, it locks in the second position and the windows show a visually distinctive color such as red. This gives an indication from afar that the valve is open. The hand wheel cover is rotated further and as the top portion is now locked to the bottom portion, the valve is opened.

When the valve is closed, the initial rotation of the hand wheel occurs with the top portion locked in the second position, thus the windows still show red. When the valve is closed, the user operates a simple release mechanism which permits the top portion to be rotated back to the first position. Thus the red color is no longer visible in the windows, and one can see from a distance that the valve has been closed.

The present invention provides a hand wheel cover for a valve comprising: a molded cover having ribbed external edges for gripping, a recess underneath the molded cover to fit over a hand wheel and prevent rotation of the hand wheel within the cover, and at least one locking tab to retain the cover on the hand wheel.

In another embodiment, there is provided an indicator hand wheel cover for indicating when a valve is open or closed, comprising: a bottom portion having a recess underneath to fit over and engage a hand wheel, a top portion retained to the bottom portion and rotatable from a first position to a second position on the bottom portion, the top portion having visual openings that view a first location on the bottom portion in the first position and a second location on the bottom portion in the second position, the second location being visually distinctive from the first location, a locking mechanism to lock the top portion to the bottom portion when the top portion is rotated from the first position to the second position, and a release for the locking mechanism to release the top portion from the bottom portion in the second position, to permit the top portion to be rotated from the second position to the first position.

BRIEF DESCRIPTION OF THE DRAWINGS

In drawings which illustrate embodiments of the present invention.

DESCRIPTION OF THE PREFERRED EMBODIMENTS

Figure 1:
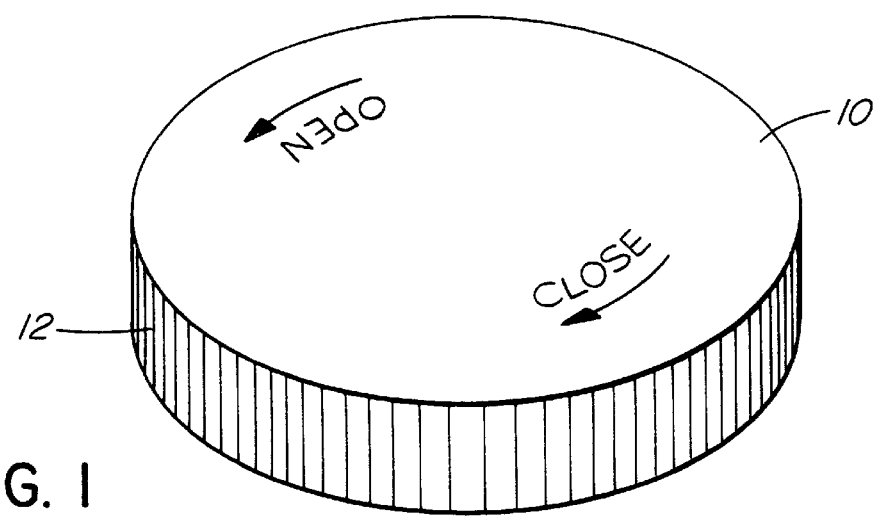
FIG. 1 is an isometric view showing a hand wheel cover according to one embodiment of the present invention.
Figure 2:
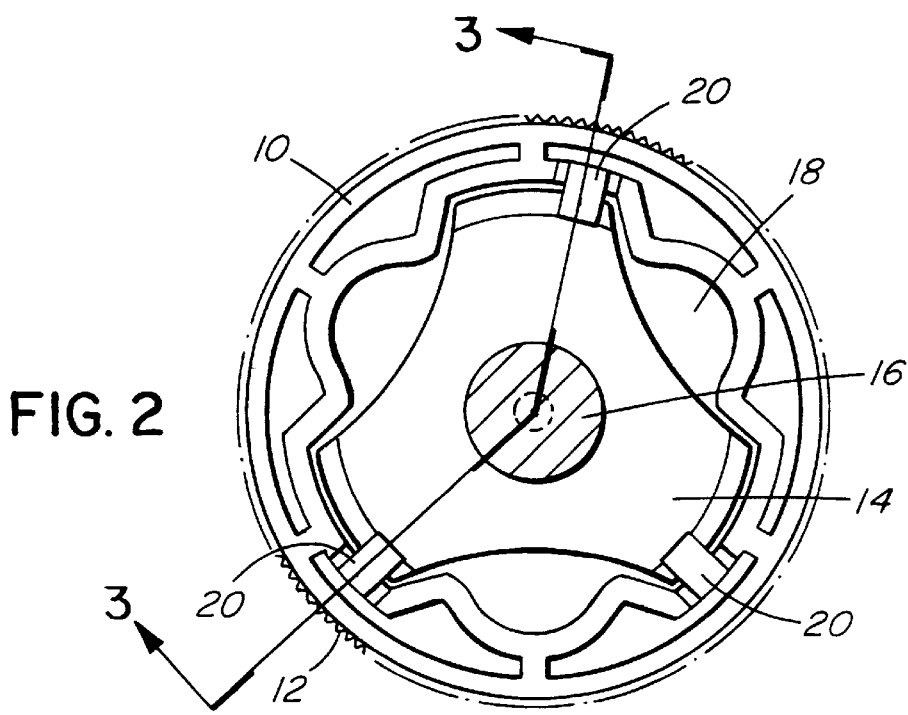
FIG. 2 is an underside view showing a hand wheel cover attached to a hand wheel.
Figure 3:
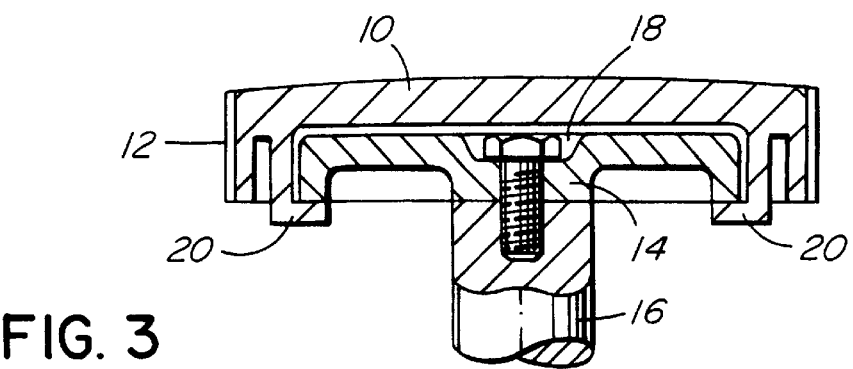
FIG. 3 is a sectional view taken at line 3—3 of FIG. 2.

Referring now to FIGS. 1, 2 and 3, a hand wheel cover 10 is shown in FIG. 1 which is substantially circular and has ribbed edges 12 to assist in gripping. As shown in FIGS. 2 and 3, a hand wheel 14 mounted on a valve stem 16 fits into a recess 18 on the underside of the cover 10. As shown in FIG. 2, the recess 18 is shaped to take two different sizes of hand wheels 14, although it may have a recess for only one hand wheel shape. One specific hand wheel 14 is shown therein, another shape of hand wheel (not shown) may fit into the recess 18, engaging the three openings shown adjacent the existing hand wheel 14. Locking tabs 20 are sloped outwardly so they may be pushed over the hand wheel 14 and then lock in place. To remove the hand wheel cover 10, it is necessary to push the locking tabs 20 outwards so they disengage from the hand wheel 14. The underside of the cover 10 has spaces between the outer rim and the recess perimeter for lightness and also so that the locking tabs 20 can deflect backwards when the cover is pushed over a hand wheel 14.

As shown in FIG. 1, the cover is larger in diameter than the hand wheel 14 and letters stating OPEN and CLOSED with arrows may be placed on the top surface of the cover 10 where they are more easily readable because the cover size is greater than the hand wheel. It will be understood that the dimensions of the hand wheel cover may well be restricted by the parameters of, for example, a propane gas tank or cylinder.

Figure 4:
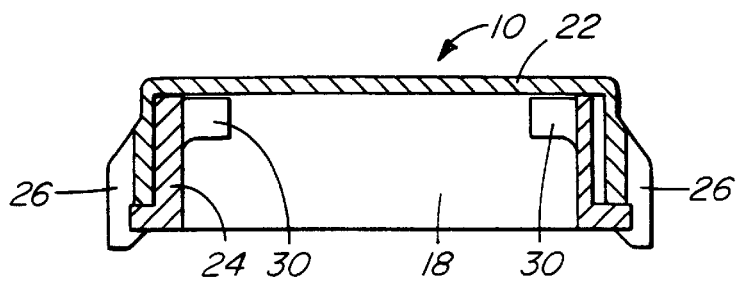
FIG. 4 is a sectional view showing a two-part hand wheel cover according to another embodiment of the present invention.
Figure 5:
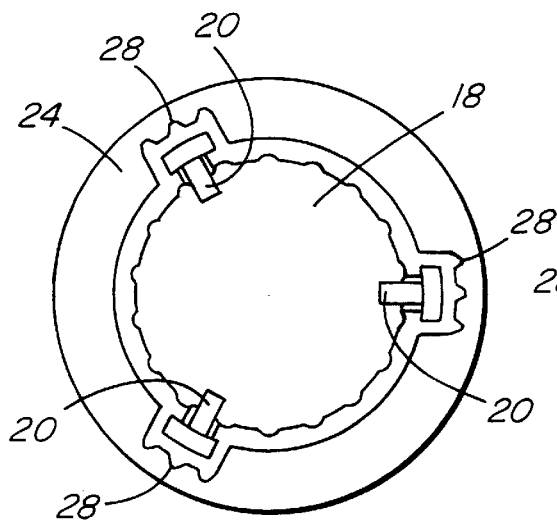
FIGS. 5 to 8 are underside views showing hand wheel covers to fit different shapes and types of hand wheels.

Another embodiment of a handwheel cover is shown in FIG. 4 that has an overcap 22 which fits over an adaptor 24. Overcap locking tabs 26 are shown in place at the sides to lock the overcap 22 to the adaptor 24. Whereas two overcap locking tabs 26 are shown, three or more may be provided depending upon the size of the hand wheel cover.

Figure 6:
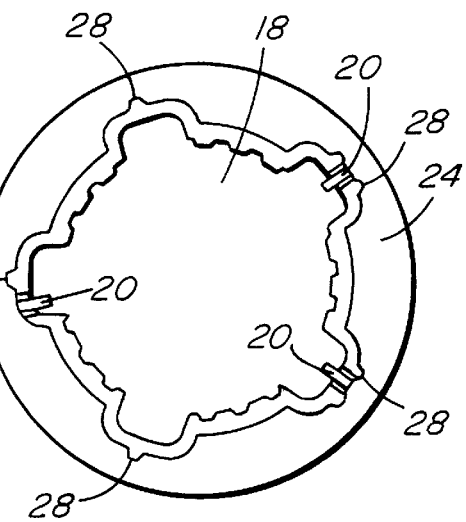
Figure 7:
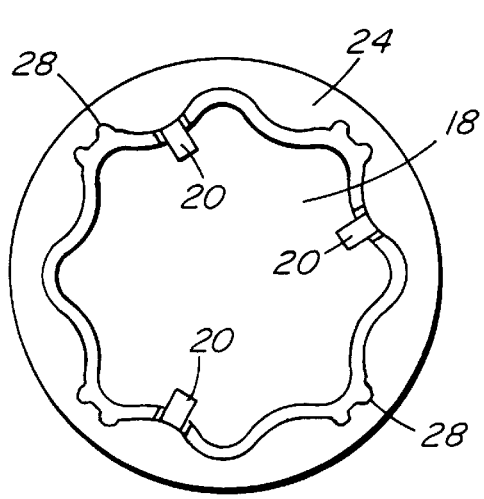
Figure 8:
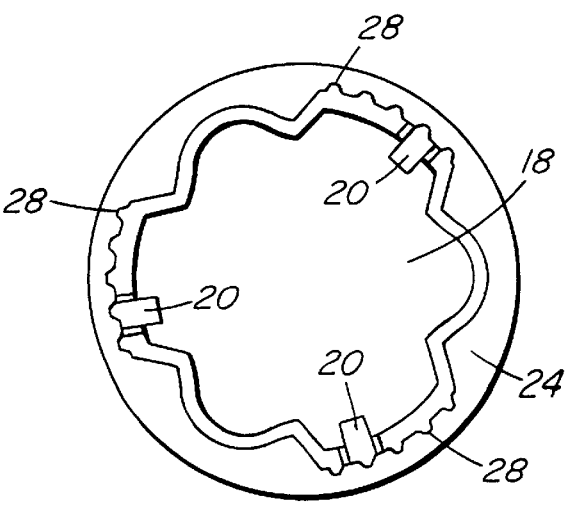

FIGS. 5 to 8 show different shaped recesses 18 in the underside of adaptors 24 to suit different shapes of handwheels. For example, FIG. 5 fits a hand wheel which is circular having ribbed edges, FIG. 6 shows a five-point hand wheel, FIG. 7 shows an eight-point hand wheel and FIG. 8 shows a recess similar to that shown in FIG. 2 to take either a three-point hand wheel or a six-point hand wheel, or alternatively, a different shape of three-point hand wheel. In each case, locking tabs 20 are provided to ensure that the hand wheel 14 is retained in the recess 18.

All of the adaptors 24 have exterior ribs 28 that engage in internal grooves of the overcap 22. Thus, the adaptor 24 cannot rotate in the overcap 22 but is held in place and retained by means of the overcap locking tabs 26.

Because some hand wheels are thicker than others, internal shoulders 30 as shown in FIG. 4 are provided to prevent the thinner hand wheels 14 recessing too far into the adaptor 24. When the adaptor 24 is arranged to contain more than one type of hand wheel 14, then the internal shoulders 30 are arranged only to prevent the one type of thin hand wheel 14 from being pushed too deeply into the recess 18 of the adaptor 24. The recesses 18 for the thicker hand wheels do not have internal shoulders 30, and thus hand wheels 14 can fit flush with the recesses 18 in the adaptor 24.

Figure 9:
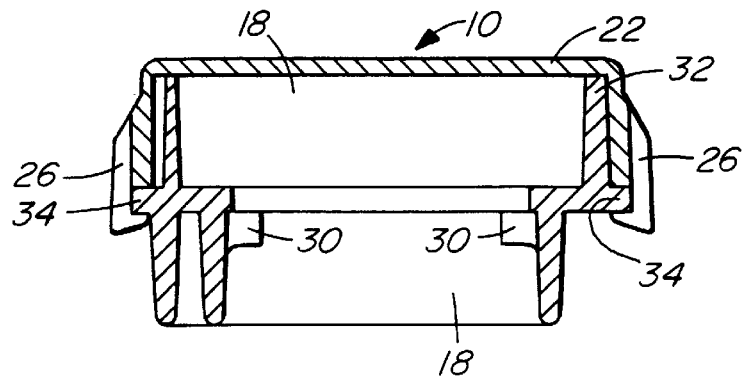
FIG. 9 is a sectional view showing a two-part hand wheel cover according to another embodiment of the present invention, with a reversible adaptor with multiples sizes for fitting different shapes and types of hand wheels.

FIG. 9 shows a two-sided reverse adaptor 32 that can be reversed within the overcap 22. A flange 34 is positioned at the center of the adaptor 32 which may be locked with the overcap locking tabs 26. The adaptor 32 can be inserted into the overcap 22 from either one side or the other. The two sides of the adaptor 32 have recesses 18 to match different sizes of hand wheels. For example, FIGS. 5 to 8 show different shaped recesses 18 for different hand wheel shapes, and in some embodiments, it is possible to design recesses 18 that take more than one hand wheel shape. Thus, the two-sided adaptor 32 as shown in FIG. 9 allows the cover 10 to fit four or more different types and sizes of hand wheel. Internal shoulders 30 are shown in one recess 18 so that thinner hand wheels can be fitted and do not protrude too deeply into the recess 18.

Figure 10:
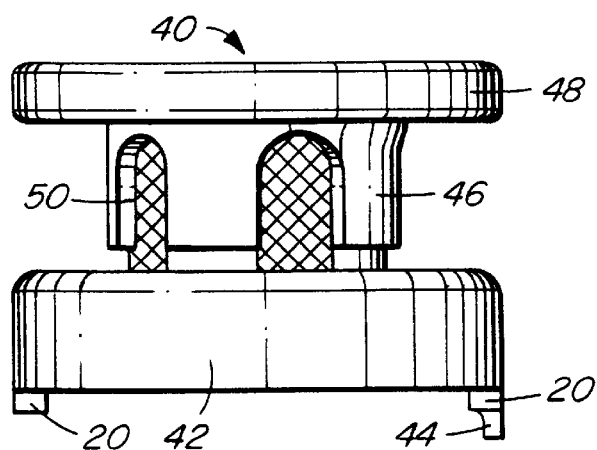
FIG. 10 is an elevational view showing an indicator hand wheel cover according to one embodiment of the present invention in the open or second position.
Figure 11:
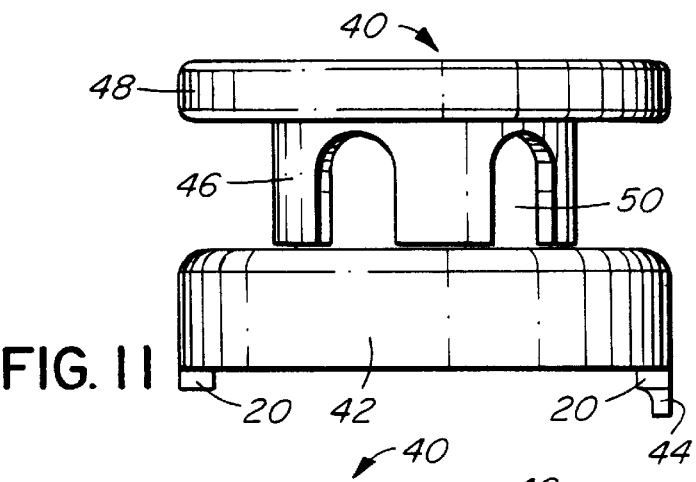
FIG. 11 is an elevational view showing the indicator hand wheel cover of FIG. 10 in the closed or first position.
Figure 12:
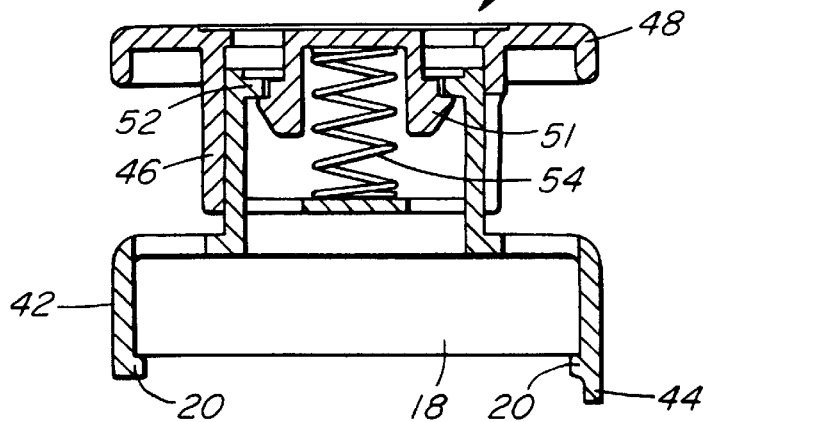
FIG. 12 is a sectional view showing the indicator hand wheel cover of FIGS. 10 and 11.
Figure 13:
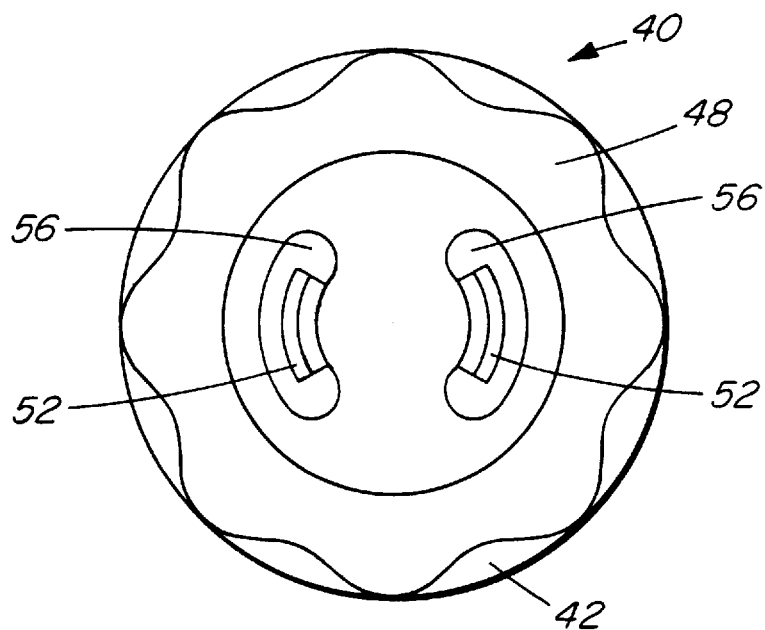
FIG. 13 is a top view showing the indicator hand wheel cover of FIG. 12.
Figure 14:
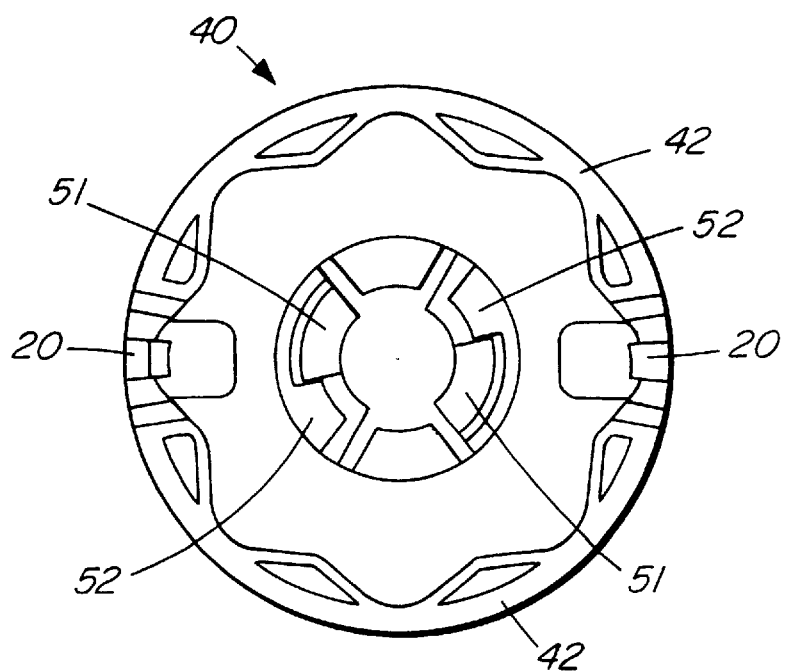
FIG. 14 is an underside view showing the indicator hand wheel cover of FIG. 12.

An indicator hand wheel cover 40 is shown in FIGS. 10 to 14 which has a snap-on bottom portion 42 with a recess 18 underneath as shown in FIGS. 12 and 14 for engaging a hand wheel. Locking tabs 20 are provided for locking the cover 40 to a handwheel in place in the recess 18. One locking tab 20 has an extended arm 44 to permit the locking tab 20 to be pushed aside for ease of removal of the cover 40. As shown in FIG. 14, only two locking tabs 20 are provided for locking the hand wheel to the bottom portion 42. Attached to the bottom portion 42 is a top portion 46 which has a locking knob 48 as shown in FIG. 13. Slots or windows 50 are shown in the sides of the top portion 46, and the top portion 40 is arranged to rotate from a first position shown in FIG. 11 to a second position shown in FIG. 10. In the first position, a first location on the surface of the bottom portion 42, has a neutral color and is visible through the windows 50. In the second position, a second location 51 on the surface of the bottom portion 42 has a distinct colored area, preferably red, visible through windows 50 colored red, and thus show clearly when the top portion 46 is rotated to the second position as shown in FIG. 10.

A locking mechanism is provided so that when the top portion 46 is rotated from the first position to the second position, it locks in place and cannot be accidentally unlocked without being released. The locking mechanism is shown more clearly in FIG. 12, wherein locking tabs 51, which are part of the top portion 46, hold the top portion 46 in place over ramp members 52 which are ramped upwards. A spring 54 provides tension between the top portion 46 and the bottom portion 42. The locking tabs 51 pass through slots 56 as shown in FIG. 13, and these slots 56 restrict rotational movement between the top portion 46 and the bottom portion 42. When the top portion 46 is rotated from the first position to the second position, the spring 54 in combination with the ramps 52 push the top portion 46 upwards. At the end of the ramps 52, there is a space, and the locking tabs 51 fit in this space and because they are held up by the spring 54, it is not possible simply to rotate the top portion 46 back from the second position as shown in FIG. 10 to the first position as shown in FIG. 11.

In order to rotate the top portion 46 from the second position back to the first position so that the red seen in the windows 50 is not visible, it is necessary to push down on the top portion 46, disengaging the locking tabs 51 from the ramps 52. It is then possible to rotate the top portion 46 back to the first position as shown in FIG. 11.

In operation, when a gas valve is to be opened, the locking knob 48 is gripped and rotated in the anticlockwise direction. This immediately rotates the top portion 40 relative to the bottom portion 42 so that the top portion 46 moves into the second position as shown in FIG. 10 with the red showing in the windows 50. The top portion 46 cannot be moved back to the first position accidentally so it will remain in this position while the knob 48 is rotated to open the valve. When the valve is open, the top portion 46 remains in the second position with the windows showing red. To close the valve, the gripping knob 48 is rotated all the way. When the valve is completely closed, then it is necessary to depress the top portion 46 and rotate the locking knob 48 in a clockwise direction until the top portion 46 is moved from the second position shown in FIG. 10 to the first position shown in FIG. 11, and no red is visible through the windows 50. Thus, when the indicator cover 40 is looked at from a distance, one will be able to see whether the valve is open or closed provided the operator has taken the necessary steps to move the top portion 46 from the second position to the first position after closing the valve. When the valve is open and the locking knob 48 is turned in the anticlockwise direction, the red is always visible in the windows 50.

Figure 15:
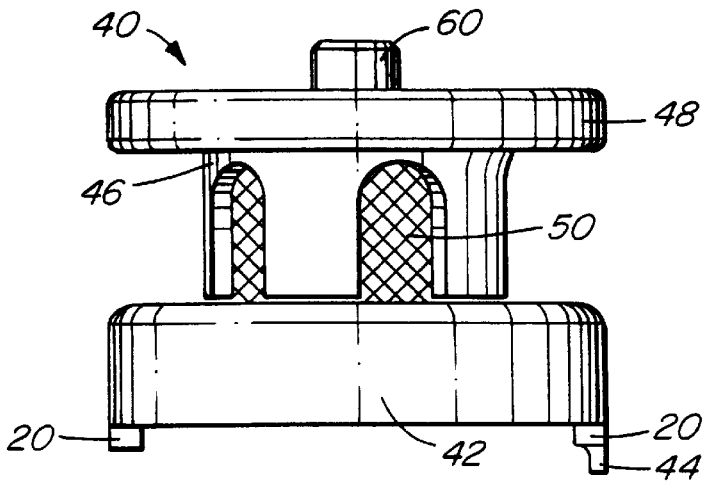
FIG. 15 is an elevational view showing an indicator hand wheel cover according to another embodiment of the present invention in the open or second position.
Figure 16:
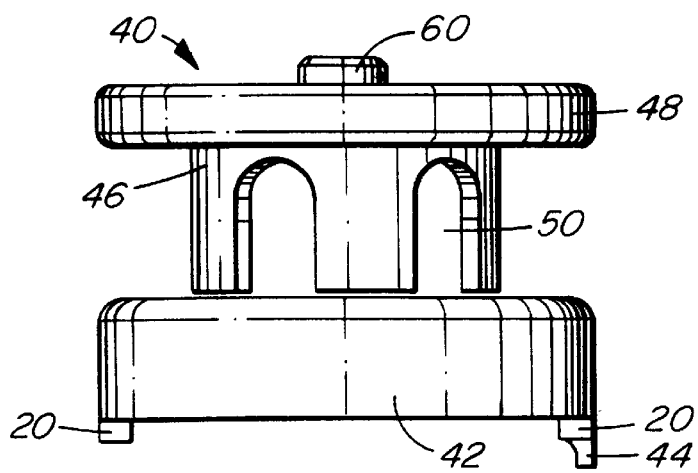
FIG. 16 is an elevational view showing the indicator hand wheel cover of FIG. 15 in the closed or first position.
Figure 17:
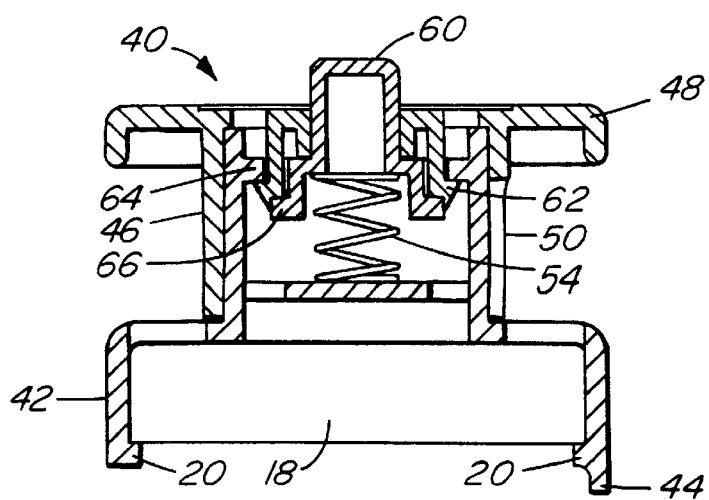
FIG. 17 is a sectional view showing the indicator hand wheel cover of FIGS. 15 and 16.

Another embodiment of an indicator hand wheel cover 40 is shown in FIGS. 15, 16 and 17, wherein the locking knob 48, unlike the embodiment shown in FIGS. 10, 11 and 12, does not rise up when the top portion 46 is rotated from the first position to the second position. Instead, a central push button 60 is provided, extending through an aperture in the top of the top portion 46. Locking tabs 62 forming part of the top portion 46 extend down to hold the top portion to shoulders 64 provided in the bottom portion 42. Thus, the top portion is able to rotate with respect to the bottom portion but does not rise up. The locking tabs 62 of the top portion 46 have sloped edges and a gap (not shown) at one position. The push button 60 has a peripheral lip 66 which engages the sloped edges of the locking tabs 62. When the top portion 46 is rotated from the first position as shown in FIG. 16 to the second position as shown in FIG. 15, the first portion 46 rotates with the second portion 42 until the peripheral lip 66 of the push button 60 engages slots wherein they rise up, being forced up by the spring 54. In this position, the push button 60 extends upwards as shown in FIG. 15. The peripheral lip 66 of the push button 60 engage in slots of the lower portion 42, thus preventing the top portion 46 accidentally rotating relative to the bottom portion 42, and red shows through windows 50 as seen in FIG. 15.

To release the top portion 46 from the bottom portion 42, it is necessary to press the button 60 which disconnects the peripheral lip 66 from the bottom portion 42, and allows the locking knob 48 to be rotated to the first position as shown in FIG. 16. In this position the windows 50 show a neutral color.

Figure 18:
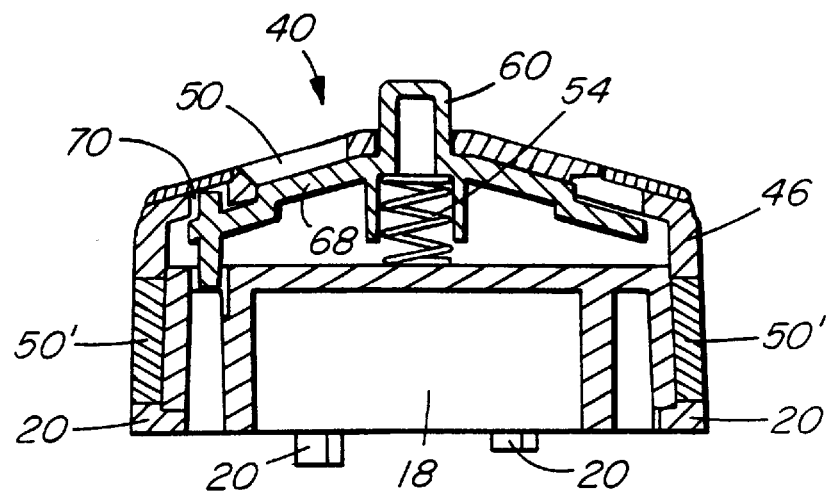
FIG. 18 is a sectional view showing an indicator hand wheel cover according to a further embodiment of the present invention.
Figure 19:
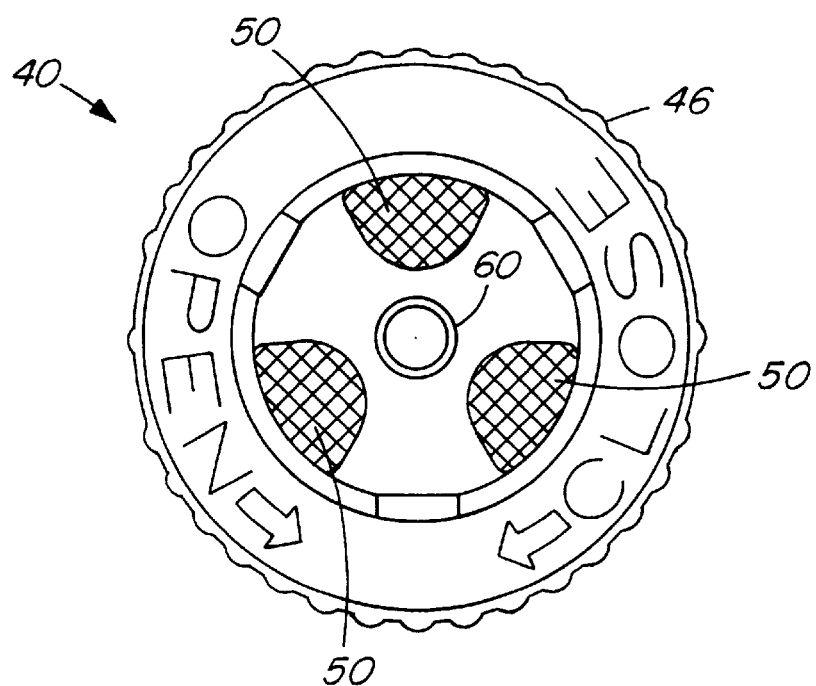
FIG. 19 is a top view showing the indicator hand wheel cover of FIG. 18 in the open or second position.

Another embodiment of an indicator hand wheel cover 40 is shown in FIGS. 18 and 19, wherein the top portion 46 is substantially an overcap surrounding the bottom portion 42. Window apertures 50 are shown on the top surface of the top portion 46, thus, when the top portion 46 rotates, there is in effect a push button member 60 which has flanged surfaces 68 positioned under the windows 50 in the top portion 46. This embodiment of the indicator hand wheel cover 40 is suitable for propane tanks on barbecues. The indicator is visible from the top, and is not so tall as the other types of indicators and thus is not effected by the heat from a barbecue when the propane tank is directly underneath the burner. FIG. 18 shows the indicator hand wheel cover 40 in the second position, with the push button knob 60 raised, red is seen through windows 50 as seen in FIG. 19. When the push button know 60 is depressed against spring 54, it is released from a slot 70 in the underside of the top portion 46, thus permitting rotation of the top portion 46 relative to the bottom portion 42, and this in turn changes the position of the windows 50 on the push button flanges 68. The location of the push button flanges 68 under the windows 50 in the second position is colored red or another distinctive color, and when the top portion 46 is rotated back to the first position with the push button 60 depressed, then the location on the push button flanges 68 are a neutral color so there is no visual indication. In one embodiment, the windows 50 have clear plastic over the top to avoid dirt and the like plugging up the windows. In yet another embodiment side windows 50 are provided in the side of the top portion 46 so red is visible on top and at the side when the cover 40 is in the open position.

The indicator hand wheel cover 40 shown in FIG. 18 is more appropriate for propane gas bottles and cylinders, as the windows 50 are easily viewable from on top.

In a further embodiment the indicator hand wheel cover 40, as shown in FIG. 18, does not have a push button 60 but has the top portion 46 rising up as shown in FIGS. 10 and 12.

All the embodiments shown herein have a closed position or first position when the top portion or the push button is depressed where the windows show a neutral color which would preferably be the same color as the cover itself when the top portion is rotated to the open position or second position, the top portion is locked in that second position and the windows show a distinguishing color such as red so that users are made aware that the valve is open. When the hand wheel is closed, initially the locking knob 48 is turned until the valve is closed and at that point, the press button or the top portion of the cover is depressed so that the locking knob 48 can be rotated until the colored locations under the windows 50 are not visible.

The bottom portion 42 of the indicator hand wheel cover 40 can have different shaped recesses 18 similar to that shown in FIGS. 5 to 8. Alternatively, adaptors may be made that are replaceable to fit in the bottom portion 42, and even two-sided adaptors 32 such as those shown in FIG. 9 may be used. In all cases, locking tabs 20 are provided to ensure that the hand wheel cover 40 and the adaptors, if they are so used, cannot easily be removed or do not come apart.

Various changes may be made to the embodiments shown herein. For example, the windows 50 are shown either on the sides or on top, but in another embodiment, windows may be provided on both the sides and the top so that there is a clear indication from anywhere around the indicator when the valve is turned on.

The material of construction is preferably molded plastic. In one embodiment, the color of the units is grey and the indicating portion under the windows is bright red. In another embodiment, the covers are cream. In all cases, the hand wheel cover has a sufficiently large surface so that arrows showing opening and closing can be positioned thereon, and there is space for a manufacturer's name or logos for advertising purposes.

Various changes may be made to the embodiments shown herein without departing from the scope of the present invention, which is limited only by the following claims.

I claim:

1. A hand wheel cover for a valve comprising:
   (a) a molded cover having ribbed external edges for gripping, the molded cover having a top portion retained to a bottom portion, the top portion being rotatable for a predetermined amount from a first position to a second position in a direction to open the valve, wherein the top portion has visual openings that move from a first location to a second location on the bottom portion, the second location being colored to provide visual indication when the top portion is in the second position, the top portion lock in the second position when rotated to that position, and a release to release the top portion from the second position, to permit the top portion to be rotated from the second position to the first position;

(b) a recess underneath the molded cover to fit over a hand wheel and prevent rotation of the hand wheel within the cover; and (c) at least one locking tab to retain the cover on the hand wheel.

2. The hand wheel cover according to claim 1, wherein there are provided a plurality of molded locking tabs around the periphery of the hand wheel cover.

3. The hand wheel cover according to claim 1, wherein the recess underneath the molded cover fits at least two different hand wheel shapes.

4. An indicator hand wheel cover for indicating when a valve is open or closed, comprising:

(a) a bottom portion having a recess underneath to fit over and engage a hand wheel;

(b) a top portion retained to the bottom portion and rotatable from a first position to a second position on the bottom portion, the top portion having visual openings that view a first location on the bottom portion in the first position and a second location on the bottom portion in the second position, the second location being visually distinctive from the first location;

(c) a locking mechanism to lock the top portion to the bottom portion when the top portion is rotated from the first position to the second position; and (d) a release for the locking mechanism to release the top portion from the bottom portion in the second position, to permit the top portion to be rotated from the second position to the first position.

5. The indicator hand wheel cover according to claim 4, including at least one locking tab for the bottom portion to lock onto the hand wheel.

6. The indicator hand wheel cover according to claim 4, wherein the recess fits at least two different hand wheel shapes.

7. The indicator hand wheel cover according to claim 4, wherein the second location is colored red, so as to be visually distinctive.

8. The indicator hand wheel cover according to claim 4, wherein the visual openings in the top portion are at the side.

9. The indicator hand wheel cover according to claim 4, wherein the visual openings in the top portion are on top.

10. The indicator hand wheel cover according to claim 4, wherein the visual openings in the top portion are on top and at the side.

11. The indicator hand wheel cover according to claim 4, wherein the locking mechanism includes ramp members which raise a locking piece on the top portion when the top portion is rotated from the first position to the second position, a spring member to provide tension between the top portion and the bottom portion to hold the locking piece raised and locking the top portion in the second position, depression of the locking piece releasing the top portion from the second position and permitting the top portion to be rotated back to the first position.

12. The indicator hand wheel cover according to claim 11, wherein the locking piece comprises a push button in the top portion which is raised by the spring member to lock the top portion in the second position.

13. The indicator hand wheel cover according to claim 11, wherein the locking piece comprises the top portion which is raised by the spring member to lock the top portion in the second position.

14. The indicator hand wheel cover according to claim 13, wherein the top portion has the visual openings on top, with a transparent cover over the visual openings.

* * * * *